(12) United States Patent
Xiao

(10) Patent No.: US 9,525,854 B2
(45) Date of Patent: Dec. 20, 2016

(54) INFORMATION PROCESSING METHOD AND ELECTRONIC DEVICE

(71) Applicant: Beijing Lenovo Software Ltd., Beijing (CN)

(72) Inventor: Jianfeng Xiao, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/814,821

(22) Filed: Jul. 31, 2015

(65) Prior Publication Data

US 2016/0269695 A1    Sep. 15, 2016

(30) Foreign Application Priority Data

Mar. 9, 2015    (CN) .......................... 2015 1 0102741

(51) Int. Cl.
| | |
|---|---|
| *H04N 5/775* | (2006.01) |
| *H04N 9/80* | (2006.01) |
| *H04N 9/31* | (2006.01) |
| *H04N 7/10* | (2006.01) |
| *H04N 9/87* | (2006.01) |
| *G11B 27/36* | (2006.01) |

(52) U.S. Cl.
CPC ................. *H04N 9/31* (2013.01); *G11B 27/36* (2013.01); *H04N 5/775* (2013.01); *H04N 7/104* (2013.01); *H04N 9/87* (2013.01)

(58) Field of Classification Search
CPC ............ H04N 9/31; H04N 9/87; H04N 7/104; H04N 5/775; B11B 27/36

USPC ................ 386/230, 239, 248, 278, 353, 343
See application file for complete search history.

(56) References Cited

U.S. PATENT DOCUMENTS

| | | | | |
|---|---|---|---|---|
| 8,103,146 | B2* | 1/2012 | Imoto ................. | G11B 27/105 386/200 |
| 8,139,929 | B2* | 3/2012 | Oshima ................. | G11B 20/10 386/239 |
| 2007/0288969 | A1* | 12/2007 | Prum ...................... | A63F 13/10 725/81 |
| 2014/0136977 | A1* | 5/2014 | Arun ................. | G06F 17/30017 715/716 |

* cited by examiner

*Primary Examiner* — Robert Chevalier
(74) *Attorney, Agent, or Firm* — Schwegman Lundberg & Woessner, P.A.

(57) ABSTRACT

The present application discloses an information processing method and an electronic device. The method comprises: detecting whether a current video output unit is switched to a second video output unit different from a first video output unit at a first time to acquire a first detection result when first video content is played back by the first video output unit; recording a first playback progress of the first video content at the first time and acquiring a second playback progress based on the first playback progress when the first detection result is yes, wherein the first playback progress and the second playback progress satisfy a preset condition; and playing back, by the second video output unit, the first video content from the second playback progress. With the above method according to the present disclosure, the technical problem in the related art that video output units cannot be switched is solved, and the technical effects of playing back a video by one output unit are achieved.

14 Claims, 8 Drawing Sheets

A playback interface after a current video output unit is switched to the display unit

INFORMATION PROCESSING METHOD AND ELECTRONIC DEVICE

CROSS-REFERENCE TO RELATED APPLICATION(S)

This application claims priority to the Chinese Patent Application No. 201510102741.5, filed on Mar. 9, 2015, entitled "INFORMATION PROCESSING METHOD AND ELECTRONIC DEVICE" which is incorporated herein by reference in its entirety.

TECHNICAL FIELD

The present disclosure relates to the field of electronic technology, and in particular, to an information processing method and an electronic device.

BACKGROUND

With continuous development of science and technology, many electronic devices are equipped with increasing functions, and one of these electronic devices is an electronic device having a projection function. Due to a limited size of a display screen of an electronic device such as a mobile phone, a tablet computer or the like, when a user views a video by using the electronic device, there is an inevitable problem that it is inconvenient to view.

The inventor of the present disclosure discovers the following technical problems in the related art when implementing the technical solutions according to the embodiments of the present disclosure.

When a projection function of an electronic device having the projection function is used in the related art, content which is currently displayed by a display screen of the electronic device can only be projected to a projection area as a mirror image. For example, when a video is played back by a projection unit, content displayed by the display screen of the electronic device is also the video content which is played back by the projection unit, i.e., the video content is played back by the display screen and the projection unit at the same time, and cannot be played back by using only one of the display screen and the projection unit as an output unit. Therefore, there is a technical problem in the related art that a video output unit cannot be switched.

When a projection function of an electronic device having the projection function is used in the related art, content which is currently displayed by a display screen of the electronic device can only be projected to a projection area as a mirror image. However, the purpose of playing back a video by a projection unit while implementing other operations on the display screen cannot be achieved. Thus, there is a technical problem in the related art that other operations cannot be implemented on the display screen of the electronic device while content is projected by the projection unit.

SUMMARY

Embodiments of the present disclosure provide an information processing method and an electronic device, to solve the technical problem in the related art that video output units cannot be switched, and achieve the technical effects of playing back a video by a single output unit.

The embodiments of the present disclosure provide an information processing method applied in a first electronic device, the method comprising: detecting whether a current video output unit is switched to a second video output unit different from a first video output unit at a first time to acquire a first detection result when first video content is played back by the first video output unit; recording a first playback progress of the first video content at the first time and acquiring a second playback progress based on the first playback progress when the first detection result is yes, wherein the first playback progress and the second playback progress satisfy a preset condition; and playing back, by the second video output unit, the first video content from the second playback progress.

Alternatively, when the first video output unit is a display unit and the second video output unit is a projection unit, the detecting of whether a current video output unit is switched to a second video output unit different from a first video output unit at a first time to acquire a first detection result when first video content is played back by the first video output unit further comprises: detecting whether the current video output unit is switched from the display unit to the projection unit at the first time to acquire the first detection result when the first video content is played back by the display unit, wherein when the first video content is played back by the display unit, a current interface of the display unit is a first interface; and correspondingly, when the first video output unit is the projection unit and the second video output unit is the display unit, the detecting of whether a current video output unit is switched to a second video output unit different from a first video output unit at a first time to acquire a first detection result when first video content is played back by the first video output unit further comprises: detecting whether the current video output unit is switched from the projection unit to the display unit at the first time to acquire the first detection result when the first video content is played back by the projection unit, wherein when the first video content is played back by the projection unit, the current interface of the display unit is a second interface.

Alternatively, the second interface is a control interface different from the first interface.

Alternatively, the second playback progress is the same playback progress as the first playback progress, or the second playback progress is a playback progress which is in advance of the first playback progress by a predetermined time.

Alternatively, the playing back by the second video output unit of the first video content from the second playback progress further comprises: playing back, by the projection unit, the first video content from the second playback progress when the second video output unit is the projection unit, wherein at the same time the current interface of the display unit is switched from the first interface to the second interface; and playing back, by the display unit, the first video content from the second playback progress when the second video output unit is the display unit, wherein at the same time while the current interface of the display unit is switched from the second interface to the first interface.

Alternatively, when the electronic device comprises a gesture detection unit, the method further comprises: detecting, by the gesture detection unit, whether there is a first gesture with respect to the first video content when the first video content is played back by the first video output unit; if so, generating and executing a first operation command corresponding to the first gesture to adjust a playback state of the first video content; detecting, by the gesture detection unit, whether there is the first gesture with respect to the first video content when the current video output unit is switched from the first video output unit to the second video output unit; and if so, generating and executing a first operation command corresponding to the first gesture to adjust the playback state of the first video content.

Alternatively, the method further comprises: detecting whether there is a first voice with respect to the first video content when the first video content is played back by the first video output unit; and if so, generating and executing a first voice command corresponding to the first voice, to adjust a playback state of the first video content.

The embodiments of the present disclosure further provide an electronic device, comprising: a detection unit configured to detect whether a current video output unit is switched to a second video output unit different from a first video output unit at a first time to acquire a first detection result when first video content is played back by the first video output unit; a processing unit configured to record a first playback progress of the first video content at the first time and acquire a second playback progress based on the first playback progress when the first detection result is yes, wherein the first playback progress and the second playback progress satisfy a preset condition; and a control unit configured to play back, by the second video output unit, the first video content from the second playback progress.

Alternatively, when the first video output unit is a display unit and the second video output unit is a projection unit, the detection unit is further configured to: detect whether the current video output unit is switched from the display unit to the projection unit at the first time to acquire the first detection result when the first video content is played back by the display unit, wherein when the first video content is played back by the display unit, a current interface of the display unit is a first interface; and correspondingly, when the first video output unit is the projection unit and the second video output unit is the display unit, the detection unit is further configured to: detect whether the current video output unit is switched from the projection unit to the display unit at the first time to acquire the first detection result when the first video content is played back by the projection unit, wherein when the first video content is played back by the projection unit, the current interface of the display unit is a second interface.

Alternatively, the second interface is a control interface different from the first interface.

Alternatively, the second playback progress is the same playback progress as the first playback progress, or the second playback progress is a playback progress which is in advance of the first playback progress by a predetermined time.

Alternatively, the control unit is further configured to: play back, by the projection unit, the first video content from the second playback progress when the second video output unit is the projection unit, wherein at the same time the current interface of the display unit is switched from the first interface to the second interface; and play back, by the display unit, the first video content from the second playback progress when the second video output unit is the display unit, wherein at the same time the current interface of the display unit is while switched from the second interface to the first interface.

Alternatively, the electronic device further comprises: a gesture detection unit configured to detect whether there is a first gesture with respect to the first video content when the first video content is played back by the first video output unit, wherein if there is a first gesture with respect to the first video content, the processing unit is further configured to generate and execute a first operation command corresponding to the first gesture to adjust a playback state of the first video content; and detect whether there is a first gesture with respect to the first video content when the current video output unit is switched from the first video output unit to the second video output unit, wherein if there is a first gesture with respect to the first video content, the processing unit is further configured to generate and execute a first operation command corresponding to the first gesture to adjust the playback state of the first video content.

Alternatively, the electronic device further comprises: a voice detection unit configured to detect whether there is a first voice with respect to the first video content when the first video content is played back by the first video output unit, wherein if there is a first voice with respect to the first voice content, the processing unit is further configured to generate and execute a first voice command corresponding to the first voice, to adjust a playback state of the first video content.

The above one or more technical solutions according to the embodiments of the present disclosure provide at least the following one or more technical effects.

Firstly, in the solutions according to the embodiments of the present disclosure, when a video is played back by using the electronic device, if the projection unit of the electronic device is not turned on, the video is played back by the display unit of the electronic device, and when it is detected that the projection unit is turned on, instead of playing back the video by the projection unit while playing back the video by the display unit synchronously in the related art, a playback break point of the current video is recorded and the video is played back by the projection unit from the break point and is no longer played back by the display unit at this time. Thus, the technical solutions according to the embodiments of the present disclosure effectively solve the technical problem in the related art that a video output unit cannot be switched, and achieve the technical effects of playing back a video by a single output unit.

secondly, in the solutions according to the embodiments of the present disclosure, when the projection unit of the electronic device is used for projection, a control interface or a menu interface is displayed by the display unit of the electronic device. In this way, instead of only the video playback interface can be displayed on the display interface of the electronic device while using the projection function in the related art, a video played back by the projection unit is controlled by a user through the control interface, or other operations are implemented by the user through the menu interface. Therefore, the solutions according to the embodiments of the present disclosure solve the technical problem in the related art that other operations cannot be implemented on the display screen of the electronic device while content is projected by the projection unit, and achieve the technical effects that the other operations can still be implemented by the electronic device while content is projected by the projection unit.

thirdly, in the solutions according to the embodiments of the present disclosure, a playback break point of the current video is recorded. When a video output unit is switched, for example, the video output unit is switched from the display unit of the electronic device to the projection unit of the electronic device, a playback break point of the video when the video output unit is switched is recorded. After the video output unit has been switched completely, the video is played back by the video output unit to which the current video output unit is switched from the break point instead of playing back the video from the beginning or continuously playing back the video without any interruption. In this way, the technical effects of rationalizing the played back video and increasing user experience are achieved.

fourthly, in the solutions according to the embodiments of the present disclosure, a gesture detection apparatus and/or a voice recognition apparatus is arranged to operate the video output by the video output unit. In this way, even if the mobile phone is in a blank screen state or the mobile phone is in a non-operating state, a playback state of the video may be controlled by a gesture operation and a voice instruction, which achieves the technical effects of controlling playback of the video by detecting a gesture and/or a voice.

BRIEF DESCRIPTION OF THE DRAWINGS

In order to illustrate technical solutions in the embodiments of the present disclosure or in the related art more clearly, accompanying drawings needed to be used in the description of the embodiments or the related art will be described below in brief. Obviously, the accompanying drawings described below are merely some embodiments of the present disclosure. A person having ordinary skill in the art can further acquire other accompanying drawings according to these accompanying drawing without contributing any creative labor.

DETAILED DESCRIPTION

Embodiments of the present disclosure provide an information processing method and an electronic device, to solve the technical problem in the related art that a video output unit cannot be switched, and achieve the technical effects of playing back a video by a single output unit.

In order to solve the above technical problem, the general concept of the technical solutions according to the embodiments of the present application is as follows.

An information processing method applied in an electronic device is provided. The method comprises: detecting whether a current video output unit is switched to a second video output unit different from a first video output unit at a first time to acquire a first detection result when first video content is played back by the first video output unit; recording a first playback progress of the first video content at the first time and acquiring a second playback progress based on the first playback progress when the first detection result is yes, wherein the first playback progress and the second playback progress satisfy a preset condition; and playing back, by the second video output unit, the first video content from the second playback progress.

In the above technical solution, when a video is played back by using the electronic device, if the projection unit of the electronic device is not turned on, the video is played back by the display unit of the electronic device, and when it is detected that the projection unit is turned on, instead of playing back the video by the projection unit while playing back the video by the display unit synchronously in the related art, a playback break point of the current video is recorded and the video is played back by the projection unit from the break point and is no longer played back by the display unit at this time. Thus, the technical solution according to the embodiments of the present disclosure effectively solve the technical problem in the related art that a video output unit cannot be switched, and achieve the technical effects of playing back a video by a single output unit.

For better understanding the above technical solutions, the technical solutions of the present disclosure will be described in detail below in conjunction with accompanying drawings and specific embodiments. It should be understood that embodiments in the present disclosure and specific features in the embodiments are used to set forth the technical solutions of the present disclosure in detail, instead of limiting the technical solutions of the present disclosure. Without a conflict, the embodiments in the present disclosure and the technical features in the embodiments can be combined with each other.

First Embodiment

Figure 1:
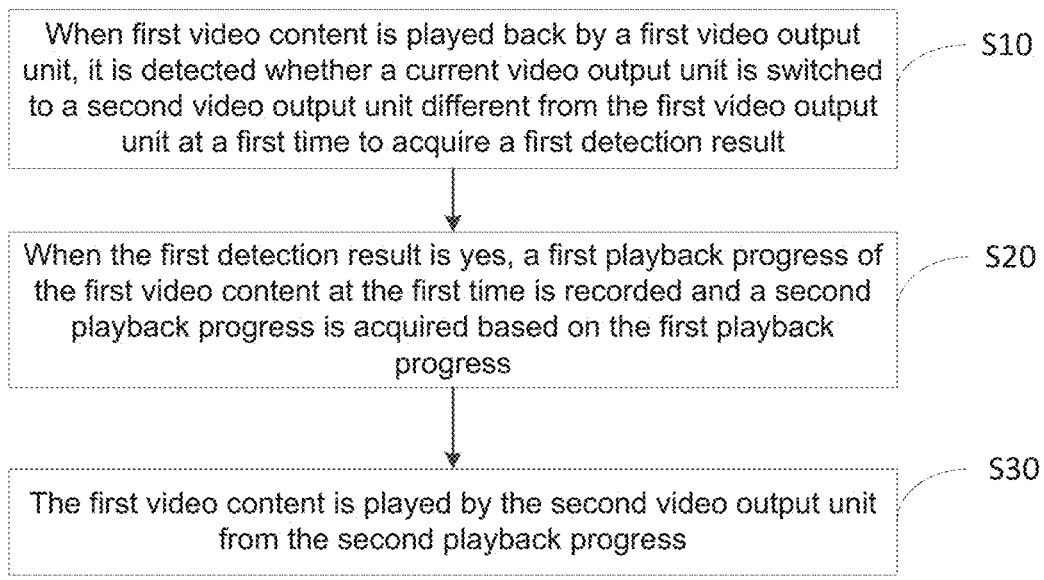
FIG. 1 is a flowchart of an information processing method according to a first embodiment of the present disclosure.

With reference to FIG. 1, an information processing method applied in a first electronic device according to an embodiment of the present disclosure is provided. The method comprises the following steps.

In S10, when first video content is played back by a first video output unit, it is detected whether a current video output unit is switched to a second video output unit different from the first video output unit at a first time to acquire a first detection result; in S20, when the first detection result is yes, a first playback progress of the first video content at the first time is recorded and a second playback progress is acquired based on the first playback progress; wherein the first playback progress and the second playback progress satisfy a preset condition; in S30, the first video content is played back by the second video output unit from the second playback progress.

In specific implementations, the video output unit may be a display unit, a projection unit or the like, and the electronic device may be a smart mobile phone, a tablet computer or the like having at least two video output units, for example, a smart mobile phone comprising a display unit and a projection unit, a tablet computer comprising two different display units, or another electronic device satisfying the condition, which will not be enumerated herein. In the embodiments of the present disclosure, the implementation process of the method according to the embodiment of the present disclosure will be described in detail by taking the electronic device being a smart mobile phone having a display unit and a projection unit as an example.

Firstly, step S10 is performed. In step S10, when first video content is played back by a first video output unit, it is detected whether a current video output unit is switched to a second video output unit different from the first video output unit at a first time to acquire a first detection result. In the embodiment of the present disclosure, step S10 may be performed in any of the following two implementations.

First Implementation

When the first video output unit is a display unit and the second video output unit is a projection unit, step S10 is specifically performed in the following implementation: when the first video content is played back by the display unit, detecting whether the current video output unit is switched from the display unit to the projection unit at the first time to acquire the first detection result, wherein when the first video content is played back by the display unit, a current interface of the display unit is a first interface.

Second Implementation

When the first video output unit is the projection unit and the second video output unit is the display unit, step S10 is specifically performed in the following implementation: detecting whether the current video output unit is switched from the projection unit to the display unit at the first time to acquire the first detection result when the first video content is played back by the projection unit, wherein when the first video content is played back by the projection unit, the current interface of the display unit is a second interface.

Further, in the above two implementations, the second interface is a control interface different from the first interface.

Figure 2:
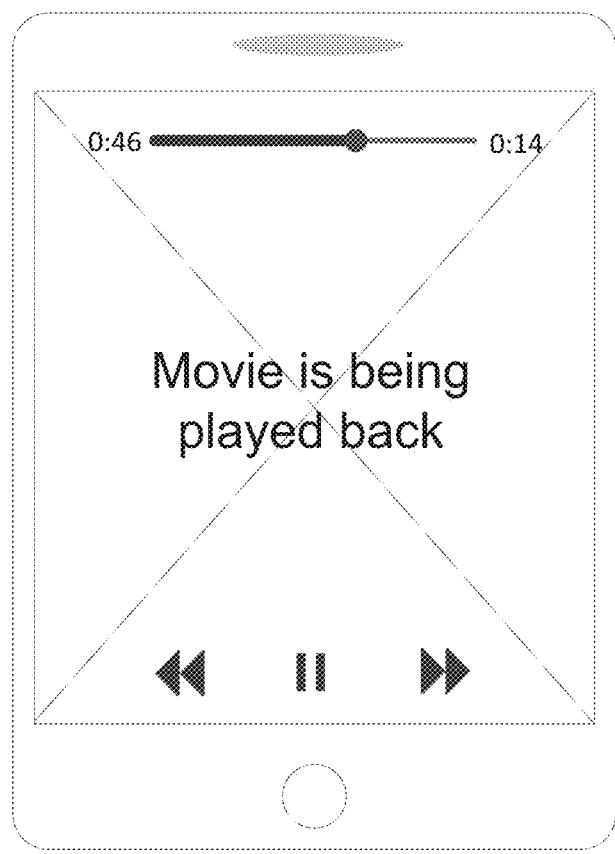
FIG. 2 is a diagram of displaying a video playback interface according to the first embodiment of the present disclosure.

Specifically, the first implementation will be described by taking a smart mobile phone having a display unit and a projection unit as an example. When a movie is played back by the display unit, a current display interface of the display unit is a video playback interface as shown in FIG. 2. During the process of playing back the movie, it is detected whether the projection unit of the mobile phone is turned on. The projection unit may be turned on by a physical key arranged on the mobile phone, or may also be turned on by clicking on a projection icon on the display unit or by selecting an operation option of playback through projection in an operation menu displayed by the display unit.

Figure 3A:
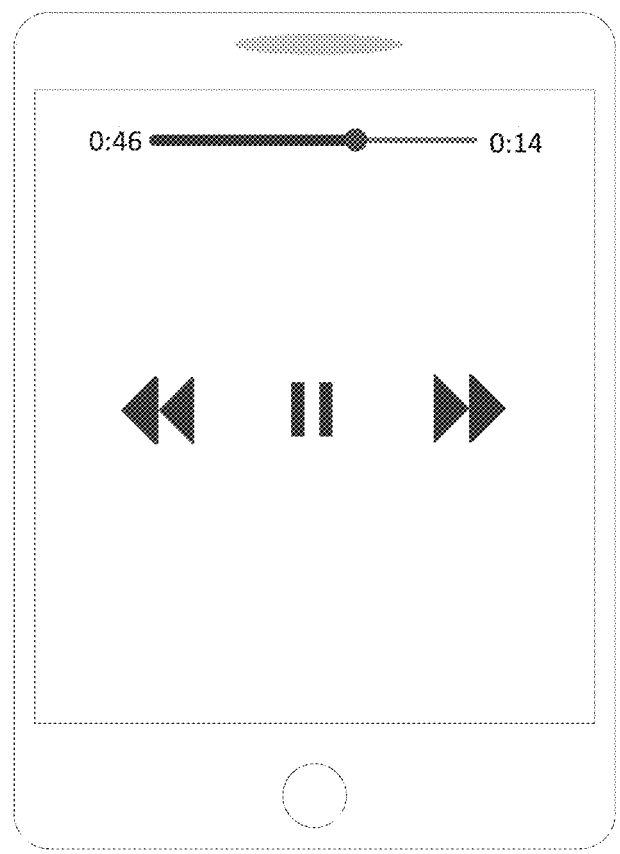
FIGS. 3A-3B are two diagrams of a control interface according to the first embodiment of the present disclosure.
Figure 3B:
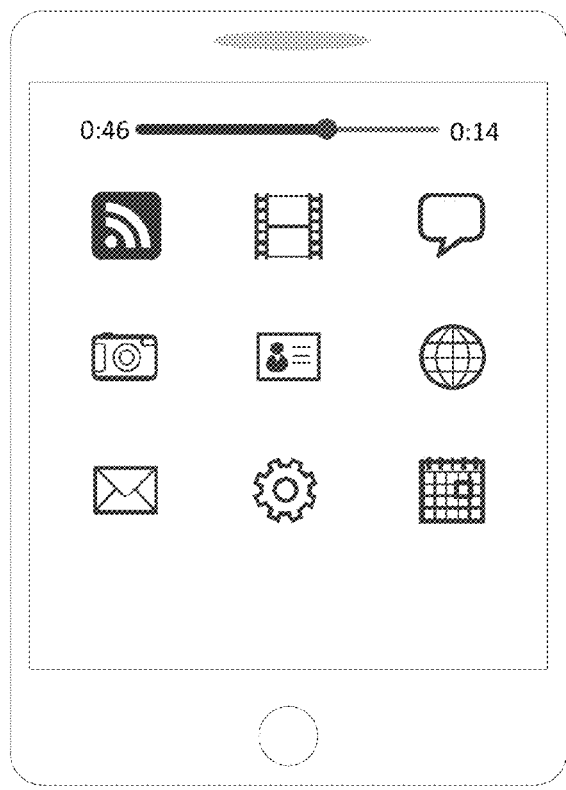

The second implementation will be described by still taking the mobile phone as an example. When a movie is projected by the mobile phone by the projection unit, an interface displayed by the display unit of the mobile phone is a control interface. The control interface may be an interface for controlling playback of the movie as shown in FIG. 3A, or may also be an operation main menu of the mobile phone as shown in FIG. 3B. When the control interface is the operation main menu, a playback progress of the movie may be displayed on the interface, or a key for controlling playback of the movie may also be displayed on the interface, for example, fast forward, pause or the like, which can be set by those skilled in the art according to practical requirements, and will not be limited in the present disclosure. During the process of playing back the movie, it is detected whether a current video output unit is switched from the projection unit to the display unit. The switching process may be implemented by a physical key arranged on the mobile phone, or may also be implemented by clicking on an icon on a display screen of the display unit or by selecting an operation option of playback through the display unit in an operation menu displayed by the display unit.

Next, step S20 is performed. In step S20, when the first detection result is yes, a first playback progress of the first video content at the first time is recorded and a second playback progress is acquired based on the first playback progress, wherein the first playback progress and the second playback progress satisfy a preset condition.

Further, the second playback progress is the same playback progress as the first playback progress, or the second playback progress is a playback progress which is in advance of the first playback progress by a predetermined time.

Specifically, by taking the above smart mobile phone as an example, when a movie is played back by the mobile phone by a display unit or a projection unit, if it is detected that a current video output unit is switched from the display unit of the mobile phone to the projection unit of the mobile phone or from the projection unit to the display unit when the movie is played back for 35 minutes and 21 seconds, a playback progress of the movie when the video output unit is switched is recorded, i.e., a time label of 35 minutes and 21 seconds is recorded. During the process of switching the video output unit, playback of the movie may be automatically paused, or a playback state of the movie may not be changed, and the movie is continuously played back. However, when it is detected that the video output unit has been switched completely, the movie is played back by the video output unit to which the current video output unit is switched from the break point of 35 minutes and 21 seconds no matter whether the movie is currently in a pause state or in a playback state. In order to avoid interruption in the process of viewing the movie by a user when the video output unit is switched, the recorded time label may be backtracked. That is, the movie is played back at a time which is in advance of 35 minutes and 21 seconds by a predetermined time, for example, 1 minute. After the video output unit has been switched completely, the movie is played back from 34 minutes and 21 seconds. Of course, the backtracking time may be set by those skilled in the art according to practical requirements, which will not be limited in the present disclosure.

Figure 4:
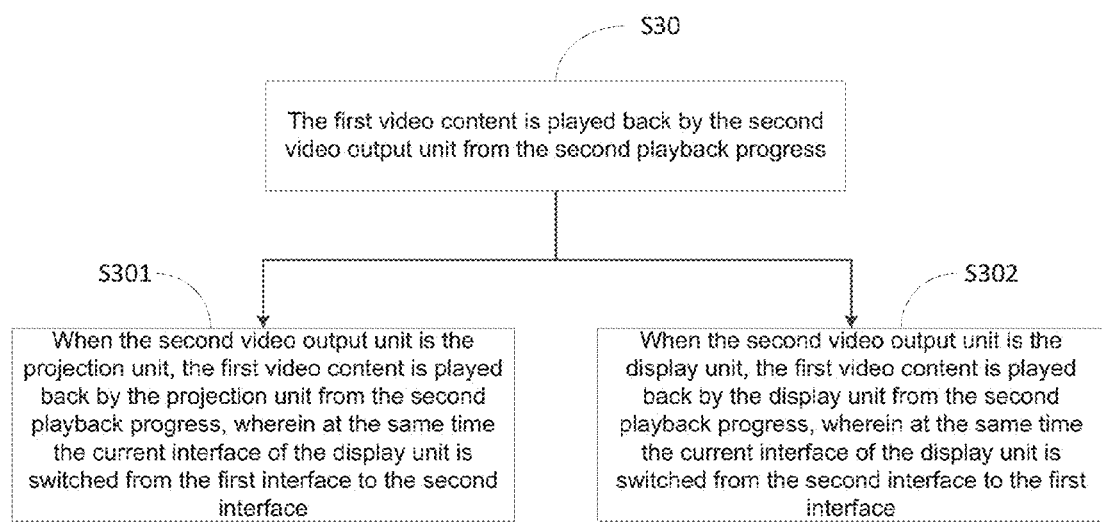
FIG. 4 is a specific implementation of step S30 in the information processing method according to the first embodiment of the present disclosure.

Then, step S30 is performed. In step S30, the first video content is played back by the second video output unit from the second playback progress. S30 is specifically performed in the following implementation as shown in FIG. 4.

In S301, when the second video output unit is the projection unit, the first video content is played back by the projection unit from the second playback progress while switching the current interface of the display unit from the first interface to the second interface.

In S302, when the second video output unit is the display unit, the first video content is played back by the display unit from the second playback progress while switching the current interface of the display unit from the second interface to the first interface.

Specifically, during the specific implementation process of S301, by still taking the above smart mobile phone as an example, when the first video output unit is the display unit and the second video output unit is the projection unit, a video is played back by the display unit. In this case, a display interface of the display unit is a first interface, i.e., a video playback interface. During the process of playing back the video by the display unit, it is detected whether to switch the current video output unit from the display unit to the projection unit. This detection process may be implemented by detecting whether to click on a physical key to turn on the projection unit on the mobile phone, or may also be implemented by detecting whether there is a first operation on an option of playback through the projection unit in an operation menu displayed by the display unit. The detection may also be implemented by those skilled in the art in other manners, which will not be limited in the present disclosure. Further, when a short message or an incoming call is received by the mobile phone, content of the short message needs to be viewed by the user through the display unit or information of the incoming call is currently displayed by the display unit, i.e., the video is no longer played back by the display unit. In this case, the current video output unit may be automatically switched to the projection unit for playback of the video.

When it is detected that the video output unit needs to be switched, a playback progress of the current video is recorded. For example, if the video has been played back for 11 minutes and 15 seconds, a time label of 11 minutes and 15 seconds is recorded. After the video output unit is switched to the projection unit, the video is played back by the projection unit from the break point of 11 minutes and 15 seconds, or the time label is backtracked as defined. For example, the video is played back at a time which is in advance of the break point of 11 minutes and 15 seconds by 30 seconds, i.e., the video is played back by the projection unit from a break point of 10 minutes and 45 seconds. In this case, the projection interface of the projection unit is a video playback interface, and a control interface instead of the video playback interface is displayed by the display unit. The control interface may be an interface of controlling a playback state of the video, or a main menu of the mobile phone, for convenience of other user's operations. Of course, the specific display content of the control interface may be set by those skilled in the art according to practical requirements, which will not be limited in the present disclosure.

Figure 5A:
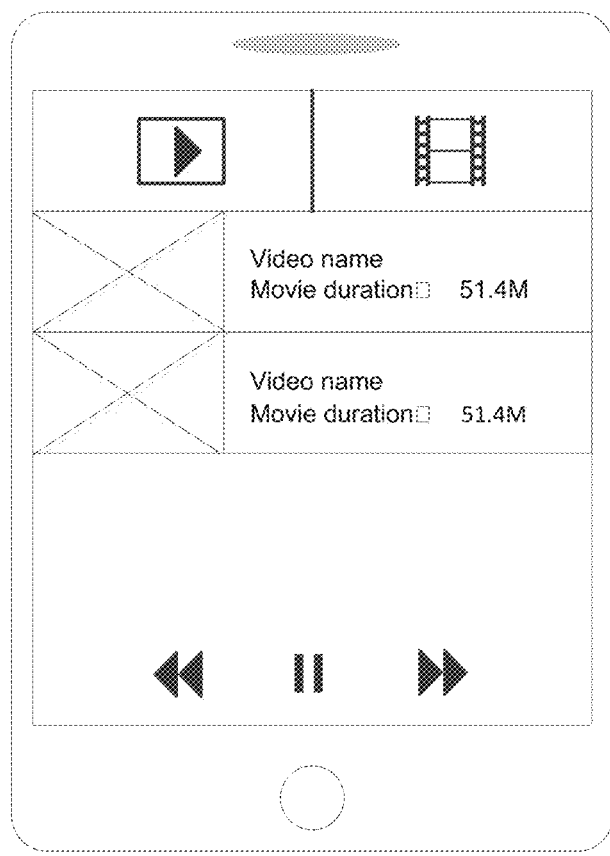
FIGS. 5A-5D are diagrams of specific implementations of step S302 according to the first embodiment of the present disclosure.
Figure 5B:
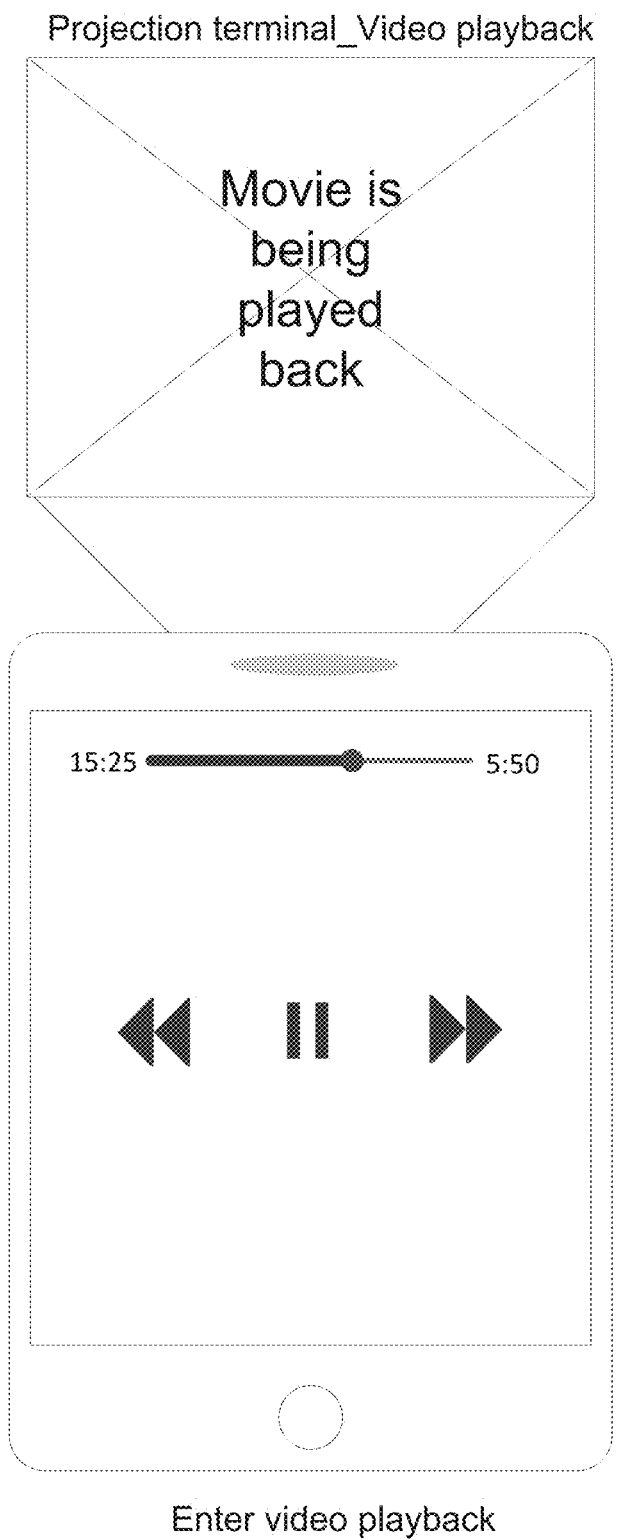
Figure 5C:
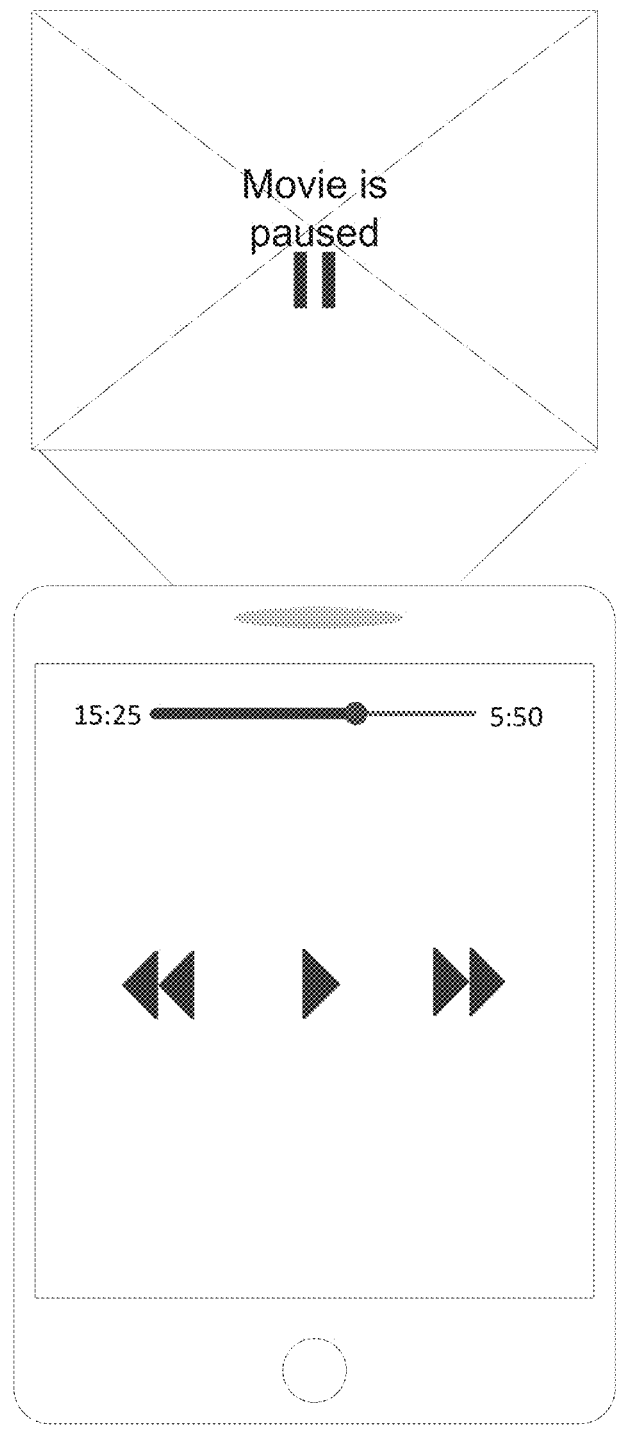

Further, during the specific implementation process of S302, by still taking the above smart mobile phone as an example, when the first video output unit is the projection unit and the second video output unit is the display unit, if a video is played back by the projection unit, the projection unit of the mobile phone needs to be firstly turned on, and a video, for example, a movie to be played back, is selected on the display unit of the mobile phone, as shown in FIG. 5A. After the selection is completed, the video playback interface is displayed by the projection unit, and the display unit jumps to the control interface, as shown in FIG. 5B. The playback state of the video may be operated by the control interface, for example, playback of the video is paused, as shown in FIG. 5C. Alternatively, other operations may be implemented by the control interface, for example, a short message is edited, or a webpage is viewed or the like.

During the process of playing back a video by the projection unit, it is detected whether to switch the video output unit, i.e., switching the video output unit to the display unit for playback of the video. The detection process may be implemented by detecting whether to click on a physical key to turn off the projection unit of the mobile phone, or by detecting whether a user clicks on a physical key to switch the video output unit on the mobile phone, or by detecting whether there is an operation on option of playback through the display unit in an operation menu displayed by the display unit. Of course, the detection may be implemented in other manners, which will not be limited in the present disclosure.

Figure 5D:
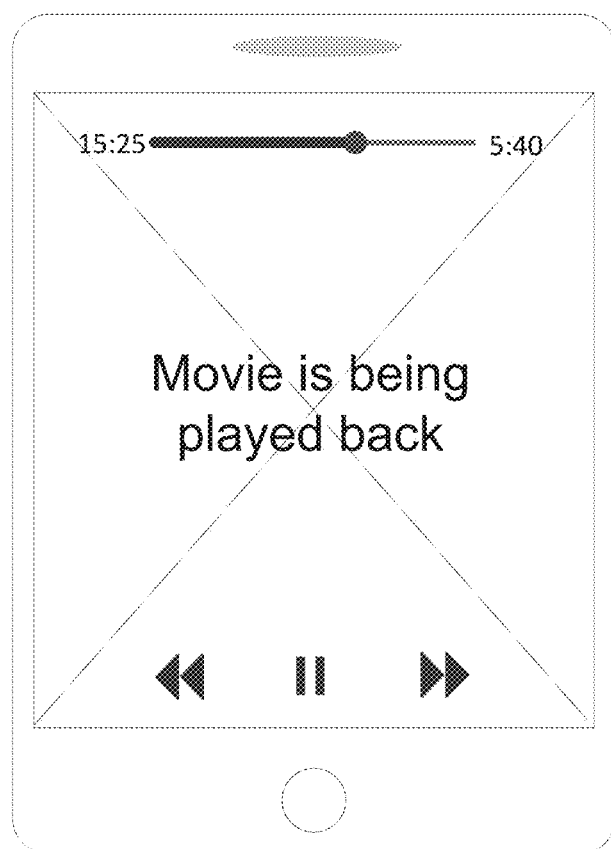
Figure 6:
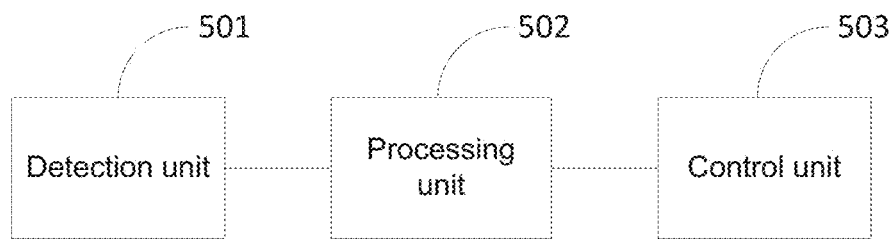
FIG. 6 is a structural block diagram of an electronic device according to a second embodiment of the present disclosure.

When it is detected that the video output unit needs to be switched, a playback progress of the current video is recorded. For example, if the video has been played back for 5 minutes and 50 seconds, a time label of 5 minutes and 50 seconds is recorded. After the video output unit is switched to the display unit, the video is played back by the display unit from the break point of 5 minutes and 50 seconds, or the time label is backtracked. For example, the video is played back at a time which is in advance of the break point of 5 minutes and 50 seconds by 10 seconds, i.e., the video is played back by the display unit from the break point of 5 minutes and 40 seconds. In this case, the display interface of the display unit is switched from the control interface to the video playback interface, as shown in FIG. 5D.

Further, when the electronic device comprises a gesture detection unit, the method according to the embodiment of the present disclosure further comprises: detecting, by the gesture detection unit, whether there is a first gesture with respect to the first video content when the first video content is played back by the first video output unit; if so, generating and executing a first operation command corresponding to the first gesture to adjust a playback state of the first video content; detecting, by the gesture detection unit, whether there is a first gesture with respect to the first video content when the current video output unit is switched from the first video output unit to the second video output unit; and if so, generating and executing a first operation command corresponding to the first gesture to adjust the playback state of the first video content.

Specifically, by still taking the above example, the mobile phone has a gesture detection apparatus arranged thereon, for example, a camera, an infrared apparatus or another gesture recognition capable apparatus, which will not be limited by the present disclosure. The gesture detection apparatus may control the played back video by detecting the current gesture of the user. For example, if the gesture detection apparatus detects an operation of a user waving hands from left to right, a playback fast forward operation is performed. If the gesture detection apparatus detects an operation of a user waving hands from right to left, a playback fast rewind operation is performed. When the gesture detection apparatus detects that a sensing region of the detection apparatus of the mobile phone is shielded by the user's hands, a playback pause operation is performed.

Specifically, when a video is played back by the display unit, the gesture detection apparatus may control the playback of the video by the display unit by detecting the gesture operation of the user. When the video is played back by the projection unit, the gesture detection apparatus may also control a playback state of the video by the projection unit by detecting the gesture operation of the user.

Further, the method according to the embodiment of the present disclosure further comprises: detecting whether there is a first voice with respect to the first video content when the first video content is played back by the first video output unit; and if so, generating and executing a first voice command corresponding to the first voice, to adjust a playback state of the first video content.

In a specific implementation, by still taking the above example, the mobile phone has a voice recognition apparatus arranged thereon, which may control the video which is currently played back by detecting a voice instruction of a user. For example, if a user issues a "fast forward" voice instruction, the voice recognition apparatus may recognize and make response to the instruction, so that the current video is in a playback fast forward state. If the user issues a "pause" voice instruction, the voice recognition apparatus may recognize and make response to the instruction, so that the current video is in a playback pause state.

No matter whether the current video output unit is a display unit or a projection unit, the voice recognition apparatus can detect whether there is a voice instruction, so as to control the video which is currently played back by the display unit or the projection unit.

Second Embodiment

Based on the same inventive concept as the information processing method according to the first embodiment of the present disclosure, the embodiment of the present disclosure provides an electronic device, as shown in FIG. 5, the electronic device comprising: a detection unit 501 configured to detect whether a current video output unit is switched to a second video output unit different from a first video output unit at a first time to acquire a first detection result when first video content is played back by the first video output unit; a processing unit 502 configured to record a first playback progress of the first video content at the first time and acquire a second playback progress based on the first playback progress when the first detection result is yes, wherein the first playback progress and the second playback progress satisfy a preset condition; and a control unit 503 configured to play, by the second video output unit, the first video content from the second playback progress.

When the first video output unit is a display unit and the second video output unit is a projection unit, the detection unit 503 is further configured to: detect whether the current video output unit is switched from the display unit to the projection unit at the first time to acquire the first detection result when the first video content is played back by the display unit, wherein when the first video content is played back by the display unit, a current interface of the display unit is a first interface; and correspondingly, when the first video output unit is the projection unit and the second video output unit is the display unit, the detection unit 503 is further configured to: detect whether the current video output unit is switched from the projection unit to the display unit at the first time to acquire the first detection result when the first video content is played back by the projection unit, wherein when the first video content is played back by the projection unit, the current interface of the display unit is a second interface.

The second interface is a control interface different from the first interface.

The second playback progress is the same playback progress as the first playback progress, or the second playback progress is a playback progress which is in advance of the first playback progress by a predetermined time.

The control unit 503 is further configured to: play back, by the projection unit, the first video content from the second playback progress while switching the current interface of the display unit from the first interface to the second interface when the second video output unit is the projection unit; and play back, by the display unit, the first video content from the second playback progress while switching the current interface of the display unit from the second interface to the first interface when the second video output unit is the display unit.

In order to control the video which is currently played back, the electronic device further comprises: a gesture detection unit configured to detect whether there is a first gesture with respect to the first video content when the first video content is played back by the first video output unit, wherein if there is a first gesture with respect to the first video content, the processing unit is further configured to generate and execute a first operation command corresponding to the first gesture to adjust a playback state of the first video content; and detect whether there is a first gesture with respect to the first video content when the current video output unit is switched from the first video output unit to the second video output unit, wherein if there is a first gesture with respect to the first video content, the processing unit is further configured to generate and execute a first operation command corresponding to the first gesture to adjust the playback state of the first video content.

In order to control the video which is currently played back, the electronic device further comprises: a voice detection unit configured to detect whether there is a first voice with respect to the first video content when the first video content is played back by the first video output unit, wherein if there is a first voice with respect to the first voice content, the processing unit is further configured to generate and execute a first voice command corresponding to the first voice, to adjust a playback state of the first video content.

The above one or more technical solutions according to the embodiments of the present disclosure provide at least the following one or more technical effects.

Firstly, in the solutions according to the embodiments of the present disclosure, when a video is played back by using the electronic device, if the projection unit of the electronic device is not turned on, the video is played back by the display unit of the electronic device, and when it is detected that the projection unit is turned on, instead of playing back the video by the projection unit while playing back the video by the display unit synchronously in the related art, a playback break point of the current video is recorded and the video is played back by the projection unit from the break point and is no longer played back by the display unit at this time. Thus, the technical solutions according to the embodiments of the present disclosure effectively solve the technical problem in the related art that a video output unit cannot be switched, and achieve the technical effects of playing back a video by a single output unit.

Secondly, in the solutions according to the embodiments of the present disclosure, when the projection unit of the electronic device is used for projection, a control interface or a menu interface is displayed by the display unit of the electronic device. In this way, instead of only the video playback interface can be displayed on the display interface of the electronic device while using the projection function in the related art, a video played back by the projection unit is controlled by a user through the control interface, or other operations are implemented by the user through the menu interface. Therefore, the solutions according to the embodiments of the present disclosure solve the technical problem in the related art that other operations cannot be implemented on the display screen of the electronic device while content is projected by the projection unit, and achieve the technical effects that the other operations can still be implemented by the electronic device while content is projected by the projection unit.

Thirdly, in the solutions according to the embodiments of the present disclosure, a playback break point of the current video is recorded. When a video output unit is switched, for example, the video output unit is switched from the display unit of the electronic device to the projection unit of the electronic device, a playback break point of the video when the video output unit is switched is recorded. After the video output unit has been switched completely, the video is played back by the video output unit to which the current video output unit is switched from the break point instead of playing back the video from the beginning or continuously playing back the video without any interruption. In this way, the technical effects of rationalizing the played back video and increasing user experience are achieved.

Fourthly, in the solutions according to the embodiments of the present disclosure, a gesture detection apparatus and/or a voice recognition apparatus is arranged to operate the video output by the video output unit. In this way, even if the mobile phone is in a blank screen state or the mobile phone is in a non-operating state, a playback state of the video may be controlled by a gesture operation and a voice instruction, which achieves the technical effects of controlling playback of the video by detecting a gesture and/or a voice.

Those skilled in the art should appreciate that the embodiments of the present disclosure can be provided as methods, systems, or computer program products. Therefore, forms such as hardware-only embodiments, software-only embodiments, or embodiments combining software and hardware can be used in the present disclosure. In addition, forms such as a computer program product which is implemented on one or more of computer usable storage media (comprising but not limited to a disk memory, a CD-ROM, an optical memory etc.) with computer usable program codes can be used in the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Specifically, computer program instructions corresponding to the information processing method according to some embodiments of the present disclosure may be stored on a storage medium such as an optical disk, a hard disk, a USB device etc. When the computer program instructions in the storage medium corresponding to the information processing method are read or executed by an electronic device, the following steps are performed: detecting whether a current video output unit is switched to a second video output unit different from a first video output unit at a first time to acquire a first detection result when first video content is played back by the first video output unit; recording a first playback progress of the first video content at the first time and acquiring a second playback progress based on the first playback progress when the first detection result is yes, wherein the first playback progress and the second playback progress satisfy a preset condition; and playing back, by the second video output unit, the first video content from the second playback progress.

Alternatively, when the first video output unit is a display unit and the second video output unit is a projection unit, after computer program instructions stored in the storage medium, which correspond to the step of detecting of whether a current video output unit is switched to a second video output unit different from a first video output unit at a first time to acquire a first detection result when first video content is played back by the first video output unit, are executed, the following steps are further performed: detecting whether the current video output unit is switched from the display unit to the projection unit at the first time to acquire the first detection result when the first video content is played back by the display unit, wherein when the first video content is played back by the display unit, a current interface of the display unit is a first interface; and correspondingly, when the first video output unit is the projection unit and the second video output unit is the display unit, after computer program instructions stored in the storage medium, which correspond to the step of detecting of whether a current video output unit is switched to a second video output unit different from a first video output unit at a first time to acquire a first detection result when first video content is played back by the first video output unit, are executed, the following steps are further performed: detecting whether the current video output unit is switched from the projection unit to the display unit at the first time to acquire the first detection result when the first video content is played back by the projection unit, wherein when the first video content is played back by the projection unit, the current interface of the display unit is a second interface.

Alternatively, the second interface is a control interface different from the first interface.

Alternatively, the second playback progress is the same playback progress as the first playback progress, or the second playback progress is a playback progress which is in advance of the first playback progress by a predetermined time.

Alternatively, after computer program instructions stored in the storage medium, which correspond to the step of playing back, by the second video output unit, of the first video content from the second playback progress, are executed, the following steps are further performed: playing back, by the projection unit, the first video content from the second playback progress while switching the current interface of the display unit from the first interface to the second interface when the second video output unit is the projection unit; and playing back, by the display unit, the first video content from the second playback progress while switching the current interface of the display unit from the second interface to the first interface when the second video output unit is the display unit.

Alternatively, when the electronic device comprises a gesture detection unit, computer program instructions corresponding to the following steps are further executed: detecting, by the gesture detection unit, whether there is a first gesture with respect to the first video content when the first video content is played back by the first video output unit; if so, generating and executing a first operation command corresponding to the first gesture to adjust a playback state of the first video content; detecting, by the gesture detection unit, whether there is a first gesture with respect to the first video content when the current video output unit is switched from the first video output unit to the second video output unit; and if so, generating and executing a first operation command corresponding to the first gesture to adjust the playback state of the first video content.

Alternatively, computer program instructions corresponding to the following steps are further executed: detecting whether there is a first voice with respect to the first video content when the first video content is played back by the first video output unit; and if so, generating and executing a first voice command corresponding to the first voice, to adjust a playback state of the first video content.

Although preferable embodiments of the present disclosure have been described, additional changes and modifications can be made to these embodiments by those skilled in the art upon learning the basic creative concepts. Therefore, the appended claims are intended to be construed as comprising the preferable embodiments and all changes and modifications that fall into the scope of the present disclosure.

Obviously, those skilled in the art can make various modifications and variations to the present disclosure without departing from the spirit and scope of the present disclosure. Thus, if these modifications and variations of the present disclosure belong to the scope of the claims of the present disclosure and the equivalent technologies thereof, the present disclosure is also intended to include these modifications and variations.

I claim:

1. An information processing method applied in an electronic device, the method comprising:
    detecting whether a current video output unit is switched to a second video output unit different from a first video output unit at a first time to acquire a first detection result when first video content is played back by the first video output unit;
    recording a first playback progress of the first video content at the first time and acquiring a second playback progress based on the first playback progress when the first detection result is yes, wherein the first playback progress and the second playback progress satisfy a preset condition; and
    playing back, by the second video output unit, the first video content from the second playback progress.

2. The method according to claim 1, wherein when the first video output unit is a display unit and the second video output unit is a projection unit, the detecting of whether a current video output unit is switched to a second video output unit different from a first video output unit at a first time to acquire a first detection result when first video content is played back by the first video output unit further comprises:
    detecting whether the current video output unit is switched from the display unit to the projection unit at the first time to acquire the first detection result when the first video content is played back by the display unit, wherein when the first video content is played back by the display unit, a current interface of the display unit is a first interface; and
    correspondingly, when the first video output unit is the projection unit and the second video output unit is the display unit, the detecting of whether a current video output unit is switched to a second video output unit different from a first video output unit at a first time to acquire a first detection result when first video content is played back by the first video output unit further comprises:
    detecting whether the current video output unit is switched from the projection unit to the display unit at the first time to acquire the first detection result when the first video content is played back by the projection unit, wherein when the first video content is played back by the projection unit, the current interface of the display unit is a second interface.

3. The method according to claim 2, wherein the second interface is a control interface different from the first interface.

4. The method according to claim 3, wherein the second playback progress is the same playback progress as the first playback progress, or the second playback progress is a playback progress which is in advance of the first playback progress by a predetermined time.

5. The method according to claim 4, wherein the playing back by the second video output unit of the first video content from the second playback progress further comprises:
    playing back, by the projection unit, the first video content from the second playback progress when the second video output unit is the projection unit, wherein at the same time the current interface of the display unit is switched from the first interface to the second interface; and
    playing back, by the display unit, the first video content from the second playback progress when the second video output unit is the display unit, wherein at the same time the current interface of the display unit is switched from the second interface to the first interface.

6. The method according to claim 1, wherein when the electronic device comprises a gesture detection unit, the method further comprises:
    detecting, by the gesture detection unit, whether there is a first gesture with respect to the first video content when the first video content is played back by the first video output unit;
    if so, generating and executing a first operation command corresponding to the first gesture to adjust a playback state of the first video content;
    detecting, by the gesture detection unit, whether there is the first gesture with respect to the first video content when the current video output unit is switched from the first video output unit to the second video output unit; and
    if so, generating and executing a first operation command corresponding to the first gesture to adjust the playback state of the first video content.

7. The method according to claim 1, further comprising:
    detecting whether there is a first voice with respect to the first video content when the first video content is played back by the first video output unit; and
    if so, generating and executing a first voice command corresponding to the first voice, to adjust a playback state of the first video content.

8. An electronic device, comprising:
    a detection unit configured to detect whether a current video output unit is switched to a second video output unit different from a first video output unit at a first time to acquire a first detection result when first video content is played back by the first video output unit;
    a processing unit configured to record a first playback progress of the first video content at the first time and acquire a second playback progress based on the first playback progress when the first detection result is yes, wherein the first playback progress and the second playback progress satisfy a preset condition; and
    a control unit configured to play back, by the second video output unit, the first video content from the second playback progress.

9. The electronic device according to claim 8, wherein when the first video output unit is a display unit and the second video output unit is a projection unit, the detection unit is further configured to:
    detect whether the current video output unit is switched from the display unit to the projection unit at the first time to acquire the first detection result when the first video content is played back by the display unit, wherein when the first video content is played back by the display unit, a current interface of the display unit is a first interface; and correspondingly, when the first video output unit is the projection unit and the second video output unit is the display unit, the detection unit is further configured to:

detect whether the current video output unit is switched from the projection unit to the display unit at the first time to acquire the first detection result when the first video content is played back by the projection unit, wherein when the first video content is played back by the projection unit, the current interface of the display unit is a second interface.

10. The electronic device according to claim 9, wherein the second interface is a control interface different from the first interface.

11. The electronic device according to claim 10, wherein the second playback progress is the same playback progress as the first playback progress, or the second playback progress is a playback progress which is in advance of the first playback progress by a predetermined time.

12. The electronic device according to claim 11, wherein the control unit is further configured to:

play back, by the projection unit, the first video content from the second playback progress when the second video output unit is the projection unit, wherein at the same time the current interface of the display unit is switched from the first interface to the second interface; and playback, by the display unit, the first video content from the second playback progress when the second video output unit is the display unit, wherein at the same time the current interface of the display unit is switched from the second interface to the first interface.

13. The electronic device according to claim 8, further comprising:

a gesture detection unit configured to detect whether there is a first gesture with respect to the first video content when the first video content is played back by the first video output unit, wherein if there is a first gesture with respect to the first video content, the processing unit is further configured to generate and execute a first operation command corresponding to the first gesture to adjust a playback state of the first video content; and detect whether there is a first gesture with respect to the first video content when the current video output unit is switched from the first video output unit to the second video output unit, wherein if there is a first gesture with respect to the first video content, the processing unit is further configured to generate and execute a first operation command corresponding to the first gesture to adjust the playback state of the first video content.

14. The electronic device according to claim 8, further comprising:

a voice detection unit configured to detect whether there is a first voice with respect to the first video content when the first video content is played back by the first video output unit, wherein if there is a first voice with respect to the first voice content, the processing unit is further configured to generate and execute a first voice command corresponding to the first voice, to adjust a playback state of the first video content.

* * * * *